(12) United States Patent
Foglia

(10) Patent No.: US 10,709,288 B2
(45) Date of Patent: Jul. 14, 2020

(54) SELF-CLEANING COFFEE MACHINE

(71) Applicant: SIMONELLI GROUP S.P.A., Belforte del Chienti (MC) (IT)

(72) Inventor: Simone Foglia, Macerata (IT)

(73) Assignee: SIMONELLI GROUP S.P.A., Belforte del Chienti (MC) (IT)

(*) Notice: Subject to any disclaimer, the term of this patent is extended or adjusted under 35 U.S.C. 154(b) by 33 days.

(21) Appl. No.: 16/027,881

(22) Filed: Jul. 5, 2018

(65) Prior Publication Data

US 2019/0021544 A1 Jan. 24, 2019

(30) Foreign Application Priority Data

Jul. 21, 2017 (IT) .................. 102017000083634

(51) Int. Cl.
| | |
|---|---|
| *A47J 31/52* | (2006.01) |
| *A47J 31/36* | (2006.01) |
| *A47J 31/46* | (2006.01) |
| *A47J 31/06* | (2006.01) |
| *A47J 31/44* | (2006.01) |
| *A47J 31/60* | (2006.01) |
| *B08B 3/10* | (2006.01) |

(52) U.S. Cl.
CPC ............ *A47J 31/525* (2018.08); *A47J 31/06* (2013.01); *A47J 31/3671* (2013.01); *A47J 31/446* (2013.01); *A47J 31/465* (2013.01); *A47J 31/468* (2018.08); *A47J 31/60* (2013.01); *B08B 3/10* (2013.01); *B08B 2203/007* (2013.01)

(58) Field of Classification Search
CPC ........ A47J 31/525; A47J 31/468; A47J 31/06; A47J 31/3671; A47J 31/446; A47J 31/465; A47J 31/60
USPC ......... 99/280, 281, 282, 283, 284, 287, 295, 99/300, 317, 323.3
See application file for complete search history.

(56) References Cited

U.S. PATENT DOCUMENTS

2017/0119202 A1 5/2017 Ottavi

FOREIGN PATENT DOCUMENTS

| | | |
|---|---|---|
| CA | 2912110 A1 | 5/2016 |
| EP | 2865302 A1 | 4/2015 |
| WO | 2016/139571 A1 | 9/2016 |

OTHER PUBLICATIONS

Search Report Form IT237 "Written Opinion" dated Mar. 23, 2018 with reference to the priority Italian Patent Application No. IT 102017000083634.

*Primary Examiner* — Phuong T Nguyen
(74) *Attorney, Agent, or Firm* — Egbert, McDaniel & Swartz, PLLC

(57) ABSTRACT

A coffee machine has a body, a dispensing unit, a conduit, a supply and heating device, a filter holder, fast coupling/uncoupling means to couple the filter holder under the conduit, a control unit, a presence sensor to detect the presence of the filter holder under the conduit, and a switch to enable the passage of electrical current towards the supply and heating device and towards the dispensing unit when the presence sensor detects that the filter holder is uncoupled from the fast coupling/uncoupling means. The control unit has a timer to manage the opening/closing of the switch.

4 Claims, 3 Drawing Sheets

1

SELF-CLEANING COFFEE MACHINE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a self-cleaning coffee machine.

2. Description of Related Art Including Information Disclosed Under 37 CFR 1.97 and 37 CFR 1.98

Coffee machines are known, which comprise a body, a dispensing unit to dispense hot water and a supply and heating device to supply hot water to the dispensing unit.

The coffee machine comprises a conduit connected to the dispensing unit to supply water from the dispensing unit. The coffee machine comprises a filter holder suitable for containing ground coffee. The filter holder is connected to the body under the conduit by means of fast coupling/uncoupling means. In view of the above, when the hot water comes out of the conduit, it passes through the ground coffee contained in the filter holder. The filter holder comprises a dispensing nozzle in lower position to dispense liquid coffee under the filter holder.

The coffee machine also comprises a push-button panel that acts as user interface, and a control unit connected to the supply and heating device, to the dispensing unit and to the push-button panel. Based on the commands given by the operator on the push-button panel, said control unit enables the supply of hot water from the conduit in order to make coffee.

Said coffee machine is impaired by a drawback because of the fact that every time coffee is made, residues of ground coffee remain on the conduit and dirty the water that will be supplied by the conduit. Consequently, the next coffee will be made with water dirtied with said residues, and not with clean water, reducing the coffee quality.

In order to solve said drawback, it is necessary to start a cleaning cycle, which is also known as purge or flushing. In other words, the user will uncouple the filter holder from the fast coupling/uncoupling means and press a button on the push-button panel to enable the water supply from the conduit. The water from the conduit will clean the conduit and eliminate the ground coffee residues.

2

The duration of the cleaning cycle can be selected from time to time by holding the button of the push-button panel pressed for the time during which water is to be supplied from the conduit.

Such a cleaning cycle is started only when the coffee machine is not used, when the bar is not crowded and only a few coffees are to be made. On the contrary, when the bar is crowded and numerous coffees are to be made, the conduit is not cleaned to avoid reducing the performance of the coffee machine, which will be used by the operator to serve as many coffees as possible in a time unit.

It must be noted that, if the number of coffees that are made between two consecutive cleaning operations of the conduit is increased, the amount of residues on the conduit will be increased as well. In fact, every time a coffee is made, new residues are added to the residues that are found on the conduit.

Moreover, the hot water supplied from the conduit makes the residues stick to the conduit. With the passing of time, such residues become encrustations that are difficult to eliminate. Consequently, the higher the time between two consecutive cleaning operations of the conduit, the more difficult it will be to eliminate the residues from the conduit completely.

WO2016/139571 discloses a device for the introduction and block of the filter holder in coffee machines. The device comprises a cylindrical body that is mounted in a vertically sliding manner in a dispensing assembly of the coffee machine. The cylindrical body of the device has an annular seat to accommodate the filter holder.

EP2865302 discloses a device for the identification of a filter holder of an espresso coffee machine comprising a support on which the filter holder to be identified is removably placed.

The purpose of the present invention is to remedy the drawbacks of the prior art by devising a coffee machine that does not make coffee with water dirtied with ground coffee residues that are stuck and/or encrusted onto the conduit.

BRIEF SUMMARY OF THE INVENTION

The coffee machine of the invention comprises a body, a dispensing unit to dispense hot water and a conduit connected to the dispensing unit to supply water from the dispensing unit.

The coffee machine comprises a supply and heating device connected to the dispensing unit to supply hot water to the dispensing unit.

The coffee machine comprises a filter holder suitable for containing ground coffee. The filter holder is disposed outside the body under the conduit. The filter holder comprises a nozzle in lower position.

The coffee machine comprises fast coupling/uncoupling means to couple the filter holder under the conduit.

The coffee machine comprises a user interface and a control unit connected to the supply and heating device and to the user interface.

The peculiarity of the coffee machine according to the invention consists in the fact that it comprises a presence sensor to detect the presence of the filter holder under the conduit. The presence sensor is connected to the control unit.

The coffee machine comprises a switch connected to the control unit, to the supply and heating device and to the dispensing unit in order to enable the passage of electrical current towards the supply and heating device and towards the dispensing unit when the presence sensor detects that the filter holder is uncoupled from the fast coupling/uncoupling means.

The control unit comprises a timer that is connected to the switch in order to manage the opening/closing of the switch.

BRIEF DESCRIPTION OF THE SEVERAL VIEWS OF THE DRAWINGS

For the sake of clarity, the description of the coffee machine of the invention continues with reference to the attached drawings, which have a merely illustrative, not limiting value, wherein.

DETAILED DESCRIPTION OF THE INVENTION

Figure 1:
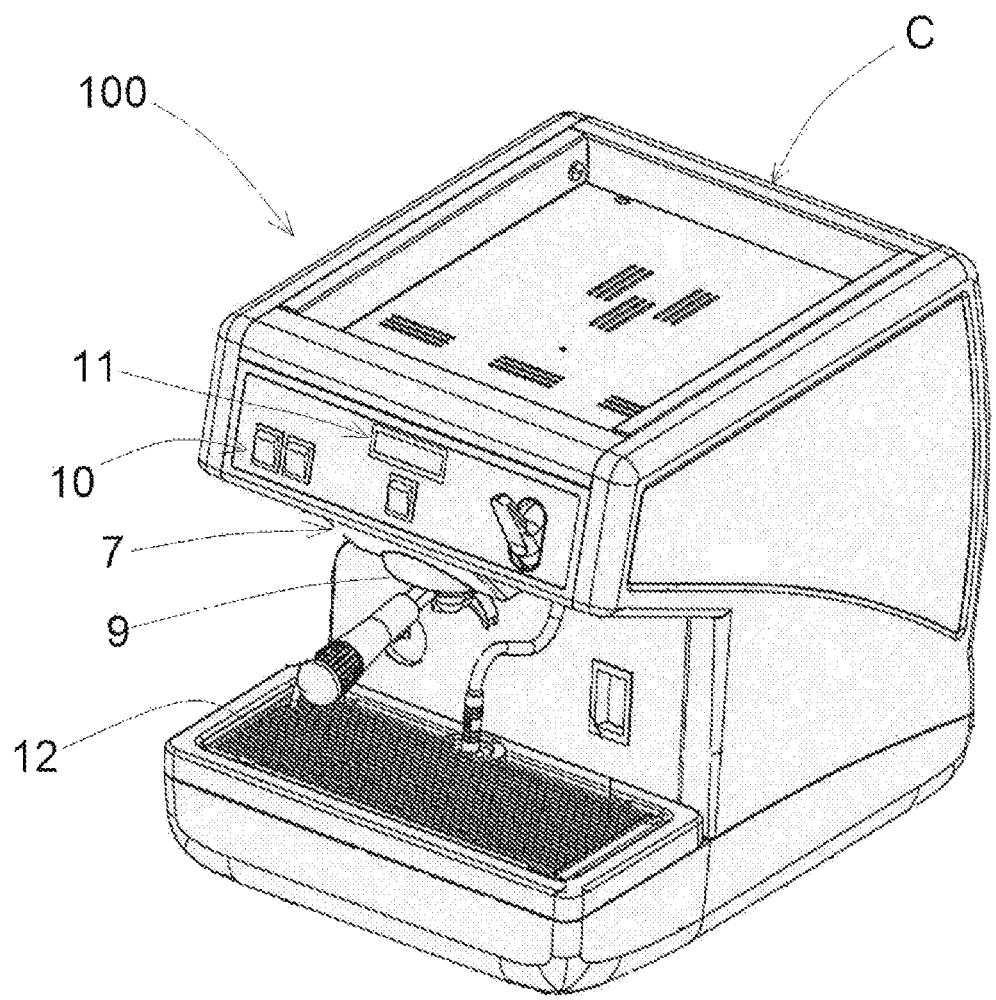
FIG. 1 is an axonometric view of a coffee machine according to the invention.
Figure 2:
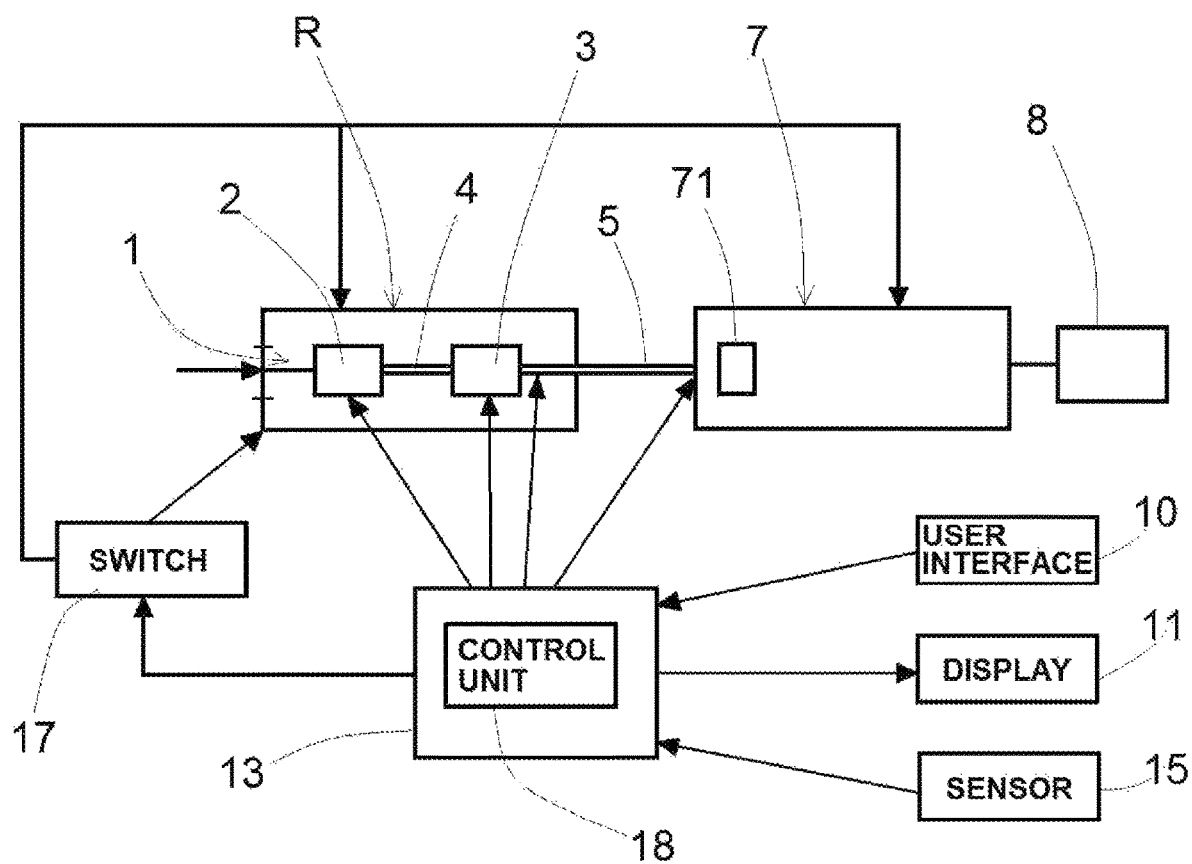
FIG. 2 is a block diagram that diagrammatically shows the coffee machine of the invention.

With reference to FIGS. 1 and 2, a coffee machine according to the invention is disclosed, which is generally indicated with reference numeral (100).

The coffee machine (100) comprises a body (C), a dispensing unit (7) to dispense hot water and a supply and heating device (R) to supply hot water to the dispensing unit (7).

With reference to FIG. 2, the supply and heating device (R) comprises an inlet (1) for the water coming from the water mains and a pump (2) suitable for conveying the water towards a boiler (3) by means of a first water conduit (4). The boiler (3) heats the water by means of a heating element of a thermosyphon circulation.

A second water conduit (5) is connected to the boiler (3) and to the dispensing unit (7) to transport the water from the boiler (3) towards the dispensing unit (7).

The dispensing unit (7) comprises an electrovalve (71) to enable/disable the passage of hot water towards the dispensing unit (7).

With reference to FIGS. 1 and 2, the coffee machine (100) comprises a user interface (10) such as a push-button panel, a display (11) and a support surface (12), disposed under the dispensing unit (7) and suitable for supporting the cups to be filled. The support surface (12) is arranged according to a horizontal plane and is preferably shaped as a grill to drain the coffee leaking from the cup. Advantageously, the support surface (12) is connected to a drain pipe of the dirty water, in such a way that the liquids following under the grill are automatically drained.

Figure 3:
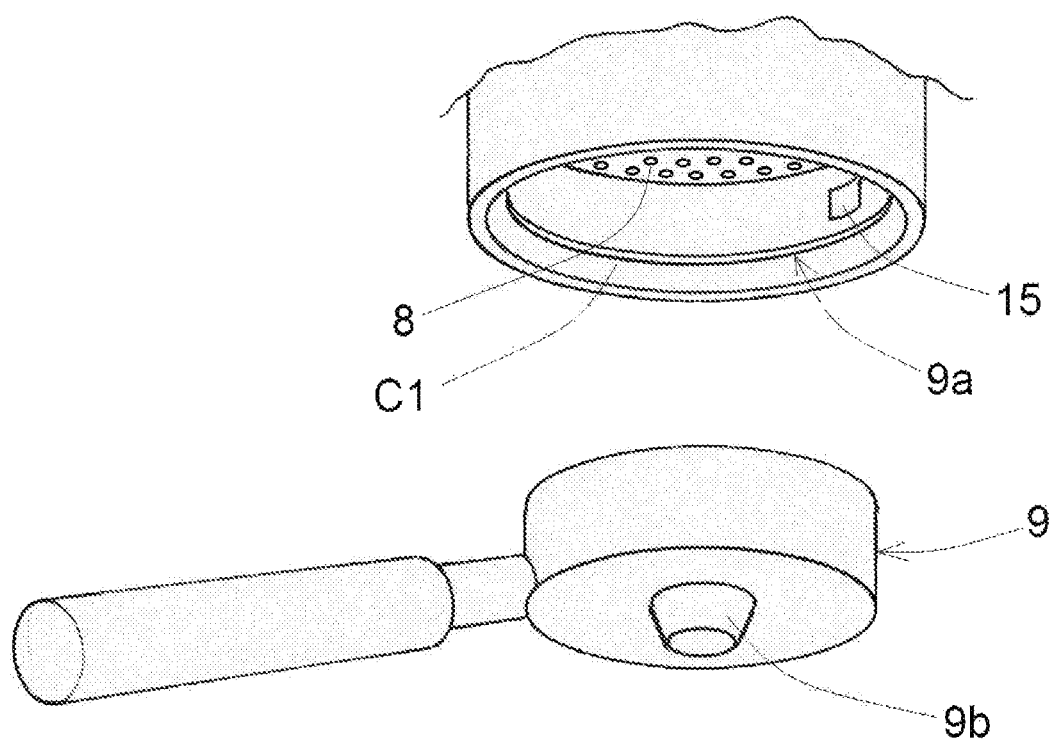
FIG. 3 is an exploded axonometric view of a portion of the coffee machine according to the invention.

With reference to FIG. 3, the coffee machine (100) comprises a conduit (8) connected to the dispensing unit (7) to supply water from the dispensing unit (7). The coffee machine (100) comprises at least a filter holder (9) suitable for containing ground coffee. The filter holder (9) is disposed outside the body (C) under the conduit (8), in such a way that the hot water from the conduit (8) passes through the ground coffee contained in the filter holder (9). The filter holder (9) comprises at least a dispensing nozzle (9b) in lower position to dispense liquid coffee under the filter holder (9).

The dispensing unit (7) comprises a nozzle (C1) that projects from the body (C) and delimits said conduit (8). The coffee machine (100) comprises fast coupling/uncoupling means (9a) to couple the filter holder (9) under the conduit (8). Advantageously, the fast coupling/uncoupling means (9a) are of bayonet type and are disposed on an internal wall of said nozzle (C1).

The coffee machine (100) comprises a control unit (13) connected to the pump (2), to the boiler (3), to the electrovalve (71), to the user interface (10) and to the display (11). According to the commands given by the operator by means of the user interface (10), the control unit (13) starts and stops the pump (2), sets the heating level of the boiler (3), and manages the opening and closing of the electrovalve (7) of the dispensing unit (7).

The coffee machine (100) makes an automatic cleaning cycle of the conduit (8) every time the filter holder is uncoupled (9) from the fast coupling/uncoupling means (9a). In order to perform said automatic cleaning cycle, the coffee machine (100) comprises a presence sensor (15) connected directly or indirectly to the control unit (13) in order to activate the cleaning cycle. Advantageously, the presence sensor (15) is disposed in correspondence of the fast coupling/uncoupling means (9a) to detect the presence of the filter holder (9) under the conduit (8). More precisely, the presence sensor (15) is disposed on the internal wall that delimits the nozzle (C1).

The coffee machine (100) comprises a switch (17) connected to the control unit (13), to the pump (2) of the supply and heating device (R) and to the electrovalve of the dispensing unit (7) in order to enable/disable the passage of electrical current towards the supply and heating device (R) and towards the dispensing unit (7) when the presence sensor (15) detects that the filter holder (9) is uncoupled from the fast coupling/uncoupling means (9a). The control unit (13) comprises a timer (18) that is connected to the switch (17) in order to manage the opening/closing of the switch (17).

The description continues by illustrating the method for the automatic cleaning of the coffee machine (100).

When the filter holder (9) is uncoupled from the fast coupling/uncoupling means (9a), the presence sensor (15) detects that the filter holder (9) is uncoupled from the fast coupling/uncoupling means (9a) and sends said piece of information to the control unit (13).

The control unit (13) starts the timer (18) and sends an activation command to the switch (17), which activates the supply and heating device (R) and the dispensing unit (7) in such a way that hot water is supplied from the conduit (8) to clean the conduit (8) from the ground coffee residues.

More precisely, the switch (17) activates the pump (2) and the electrovalve (71) to convey the water to the conduit (8).

The hot water falls from the conduit (8) on the support surface (12) and is conveyed towards the drain pipe.

It must be noted that the water supply time of the automatic cleaning cycle can be set by the user and is preferably comprised between 1 and 4 seconds. In such period of time, a quantity of water comprised between 10 and 20 ml is supplied.

When the water supply time has elapsed, the timer (18) informs that the water supply time has elapsed and the control unit (13) sends a deactivation command to the switch (17). Consequently, the supply and heating device (R) and the dispensing unit (7) are stopped and the water flow from the conduit (8) is stopped.

A waiting time between the sending of the activation command from the control unit (13) to the switch (17) and the water supply from the conduit (8) can be set. In other words, the control unit (13) starts the timer (18), which waits for a waiting time that is preferably comprised between 2 and 6 seconds before a command is sent by the control unit

(13) to the switch (17) to start supplying the water from the conduit (8). Such a waiting time allows the user to get away from the coffee machine in such a way not to come in contact with the hot water supplied from the conduit (8).

Because of the automatic cleaning cycle, the conduit (8) is cleaned and washed every time the coffee is dispensed, in such a way that the water coming from the conduit (8) is always clean.

Moreover, it must be noted that the time taken by the coffee machine (100) to perform the automatic cleaning cycle is lower than the time taken by the user to remove the ground coffee from the filter holder (9) and fill the filter holder (9) again. In view of the above, the automatic cleaning cycle does not cause any downtime and does not extend the time interval that elapses between the preparation of two cups of coffee.

Although FIG. 2 shows only one dispensing unit (7) and only one filter holder (9), the coffee machine (100) may be provided with a dispensing unit (7) that cooperates with multiple filter holders (9) that are aligned above the support surface (12) or multiple dispensing units (7) aligned above the support surface (12), wherein each dispensing unit (7) is suitable for supporting one filter holder (9).

Numerous variations and modifications can be made to the present embodiment of the invention, which are within the reach of an expert of the field, falling in any case within the scope of the invention as disclosed by the attached claims.

I claim:

1. A coffee machine comprising:
   a body;
   a dispensing unit to dispense hot water,
   a conduit connected to the dispensing unit to supply water from the dispensing unit;
   a supply and heating device connected to the dispensing unit to supply hot water to the dispensing unit;
   a filter holder intended to contain ground coffee; said filter holder being disposed outside the body under the conduit; said filter holder comprising a nozzle in lower position;
   fast coupling/uncoupling means to couple the filter holder under the conduit;
   a user interface;
   a control unit connected to the supply and heating device and to the user interface;
   characterized in that it comprises:
   a presence sensor to detect the presence of the filter holder under the conduit; said presence sensor being connected to said control unit;
   a switch connected to the control unit, to the supply and heating device and to the dispensing unit to enable the passage of electrical current towards the supply and heating device and towards the dispensing unit when the presence sensor detects the uncoupling of the filter holder from the fast coupling/uncoupling means;
   said control unit comprising a timer that is connected to the switch to manage the opening/closing of the switch.

2. The coffee machine of claim 1, wherein said presence sensor is disposed in correspondence of the fast coupling/uncoupling means.

3. The coffee machine of claim 2, wherein said dispensing unit comprises a nozzle that projects from the body and delimits the conduit; said fast coupling/uncoupling means and said presence sensor being disposed on an internal wall of said nozzle.

4. The coffee machine of claim 1, wherein said supply and heating device comprises a pump that moves the water towards the dispensing unit, and the dispensing unit comprises an electrovalve connected to the pump to enable/disable the passage of hot water towards the dispensing unit; said switch being connected to said pump and to said electrovalve.

* * * * *